United States Patent [19]
Goss, deceased et al.

[11] Patent Number: 5,354,164
[45] Date of Patent: Oct. 11, 1994

[54] BOAT LAUNCHING APPARATUS

[75] Inventors: Stuart A. Goss, deceased, late of Salisburg, N.H., by Shirley A. Goss, heir; Robert W. Bentley, P.O. Box 22, Salisbury, N.H. 03268

[73] Assignee: Robert W. Bentley, Salisbury, N.H.

[21] Appl. No.: 7,077

[22] Filed: Jan. 21, 1993

[51] Int. Cl.⁵ .................................. B60P 3/10
[52] U.S. Cl. .................. 414/462; 224/42.08; 414/494
[58] Field of Search .......... 224/42.03 R, 42.08; 414/462, 480, 494

[56] References Cited

U.S. PATENT DOCUMENTS

| | | |
|---|---|---|
| 2,082,663 | 6/1937 | Slater .......................... 414/494 X |
| 3,048,291 | 8/1962 | Mabry . |
| 3,128,893 | 4/1964 | Jones . |
| 3,170,583 | 2/1965 | Meyer . |
| 3,357,581 | 12/1967 | Scott . |
| 3,550,800 | 12/1970 | Robinson . |
| 3,687,314 | 8/1972 | Haugland . |
| 3,726,423 | 4/1973 | Miron . |
| 3,768,677 | 10/1973 | Moss . |
| 3,812,988 | 5/1974 | Pyle . |
| 3,826,391 | 7/1974 | Prince . |
| 3,843,002 | 10/1974 | Pihlgren . |
| 3,872,989 | 3/1975 | Smithson et al. ............. 414/462 |
| 4,130,211 | 12/1978 | Abascal . |
| 4,212,580 | 7/1980 | Fluck . |
| 4,274,788 | 6/1981 | Sutton . |
| 4,813,841 | 3/1989 | Eischen . |

Primary Examiner—Michael S. Huppert
Assistant Examiner—Janice Krizek
Attorney, Agent, or Firm—Wolf, Greenfield & Sacks

[57] ABSTRACT

A boat launching apparatus for pick-up trucks including a trailer framework unit pivotally disposed on the rear bumper of the truck and having automatic control for raising and lowering the trailer framework unit relative to the bed of the truck.

18 Claims, 5 Drawing Sheets

BOAT LAUNCHING APPARATUS

TECHNICAL FIELD

The present invention relates to the field of boat launching apparatus in general, and in particular to a boat launching apparatus that is mounted on the bed and bumper of a pick-up truck.

BACKGROUND ART

As can be seen by reference to the following U.S. Pat. Nos. 4,274,788; 4,212,580; 3,357,581; and 3,826,391; the prior art is replete with myriad and diverse boat launching apparatus associated with the bed of a pick-up truck.

While all of the aforementioned prior art constructions are more than adequate for the basic purpose and function for which they have been specifically designed, these patented arrangements are uniformly deficient both with regard to the complexity of the structures that are employed as well as the difficulty encountered by the operators of the apparatus in the launching and retrieval of the boat.

In addition none of the prior art solutions have realized the benefit of locating the primary pivot support point of the apparatus over the bumper of the pick-up; and, in fact the cited patents teach away from that deployment in that they leave the rear gate of the truck in place and design the systems around that obstacle.

As a consequence of the foregoing situation, there has existed a longstanding need among boat owners having pick-up trucks used to transport their boats to and from a launching site, for a new and improved apparatus that is extremely stable and which will quickly and efficiently effect the launching and retrieval of their boat; and, the provision of such a construction is a stated objective of the present invention.

DISCLOSURE OF THE INVENTION

Briefly stated, the boat launching apparatus that forms the basis of the present invention comprises in general: a trailer-framework unit; a primary support unit operatively connected between the bumper of the pick-up truck and the framework unit; and auxiliary support unit operatively connected to the framework unit and adapted to contact the bed of the pick-up truck; and control means for mechanically varying the relative position of both the primary and auxiliary support units relative to the framework unit.

As will be explained in greater detail further on in the specification, the improved performance of this invention as compared to the prior art constructions is largely attributable to the positioning of the primary support unit relative to the trailer framework unit which required that the conventional rear tailgate on the pick-up truck be removed so that the primary support unit is positioned on the rear bumper of the truck.

By virtue of this arrangement the pivoted connection between the primary support unit and the trailer framework unit is positioned closer to the center of gravity of the boat particularly in those instances wherein one or more outboard motors are mounted on the boat transom.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
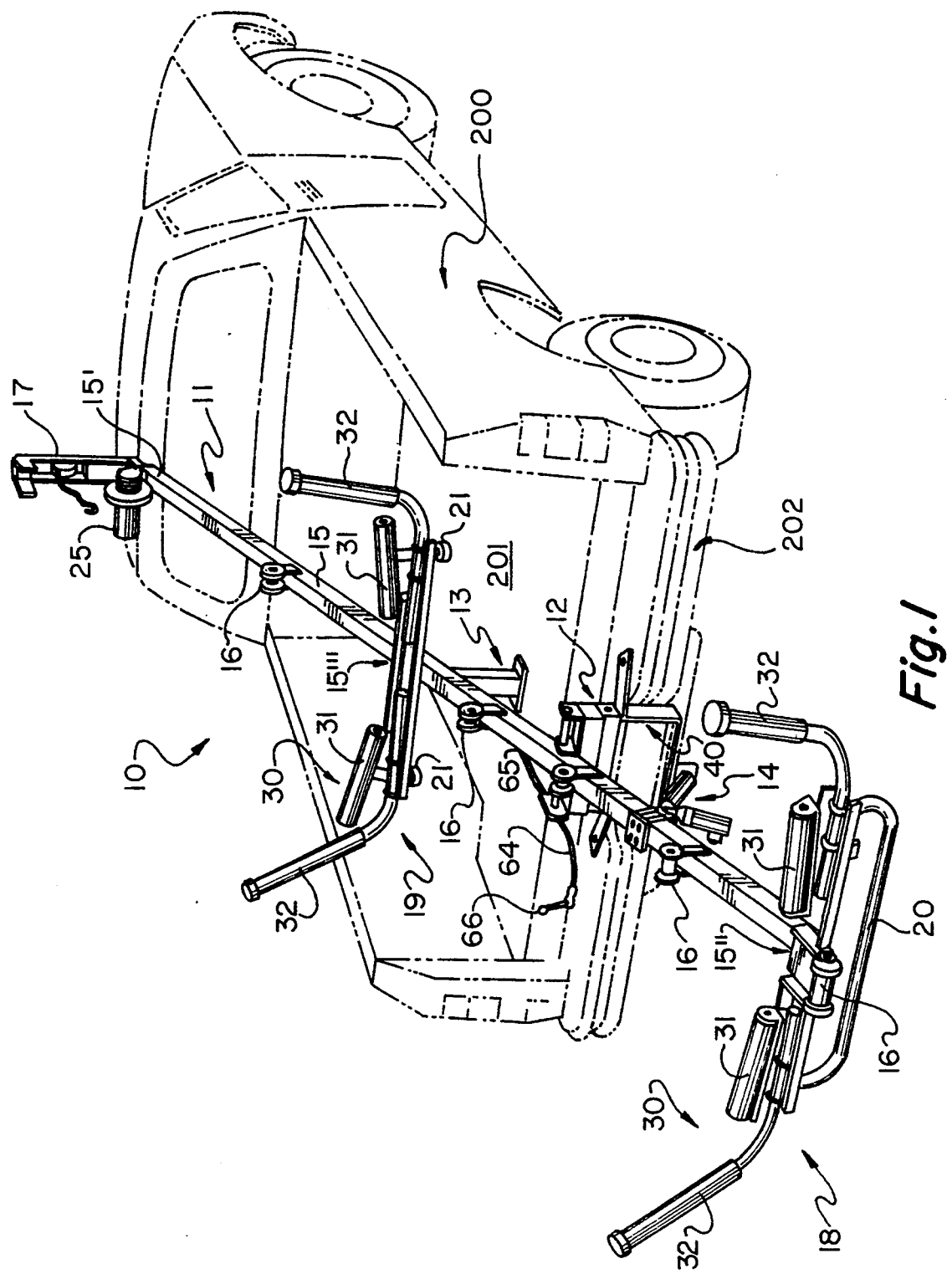
FIG. 1 is a perspective view of the boat launching apparatus deployed on a pick-up truck.

As can be seen by reference to the drawings, and in particular to FIG. 1, the boat launching apparatus that forms the basis of the present invention is designated generally by the reference numeral (10). The apparatus (10) comprises in general: a trailer framework unit (11); a primary support unit (12); an auxiliary support unit (13); and automatic control means (14) for varying the position of the trailer framework unit (11) relative to the primary (12) and auxiliary (13) support units. These units will now described in serlatim fashion.

However, prior to embarking upon a detailed description of the preferred embodiment of this invention; it should first be emphasized that this apparatus was specifically designed to be used in conjunction with a conventional pick-up truck (200) having a bed (201) and a rear bumper (202); wherein the rear tail gate (not shown) of the truck (200) has been removed in order to mount the primary support unit (12) on the rear bumper (202) for reasons that will be explained in greater detail further on in the specification.

As can best be seen by reference to FIG. 1 the trailer framework unit (11) comprises in general an elongated central support beam (15) provided with a plurality of keel roller elements (16) disposed at spaced locations along the top of the central support beam (15). In addition the trailer framework unit (11) further comprises a winch post (17) disposed on the inboard end (15') of the support beam (15) and first (18) and second (19) generally U-shaped cross-beam members disposed on the outboard end (15") and proximate the midpoint (15''') respectively of the central support beam (15).

Still referring to FIG. 1, It can be seen that both of the cross-beam members (18) and (19) are provided with a roller assembly designated generally as (30) which comprises a pair of elongated bottom roller elements (31) and a pair of side roller elements (32) disposed on opposite sides of the cross-beam members (18) and (19).

Figure 4:
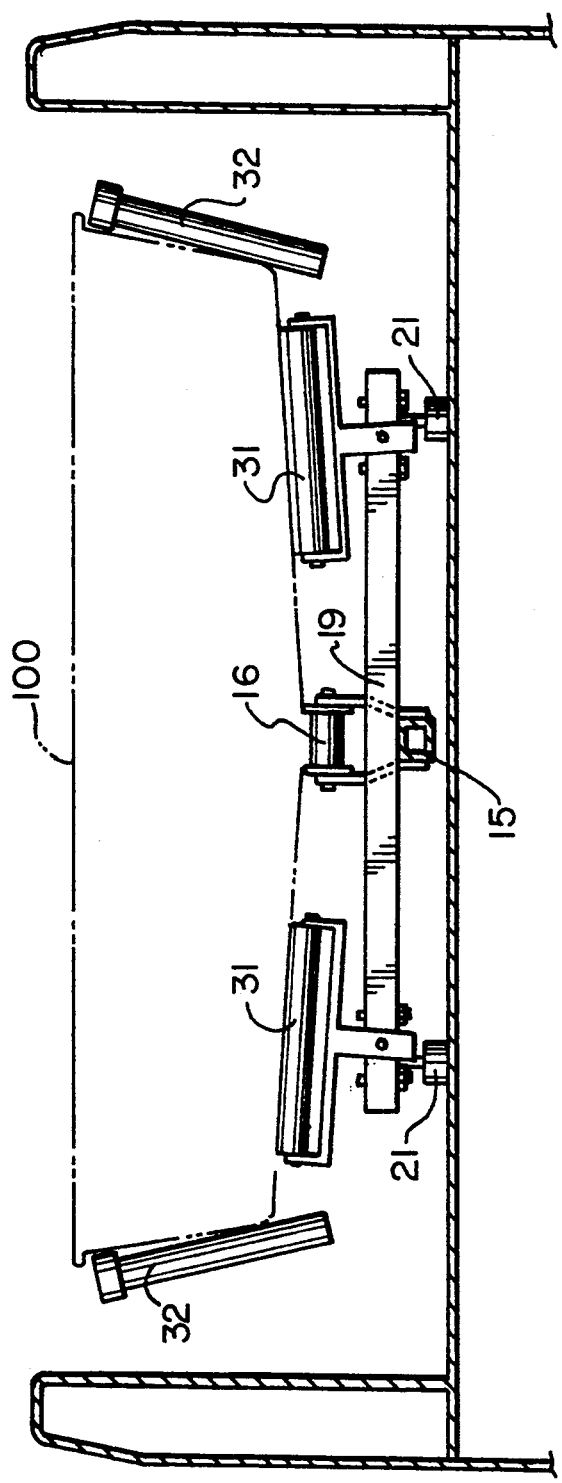
FIG. 4 is an end view depicting the roller arrangement deployed of the trailer framework unit; and, FIG. 5 is an enlarged detail view of the actuating means used to move the framework unit relative to the bed of the pick-up truck.

In addition the outboard cross-beam member (18) is further provided with a keel roller (16); and, a downwardly depending U-shaped protective extension (20); while the intermediate cross-beam member (19) as shown in FIG. 4, is provided with a pair of discrete rubber bumper elements (21).

Figure 2:
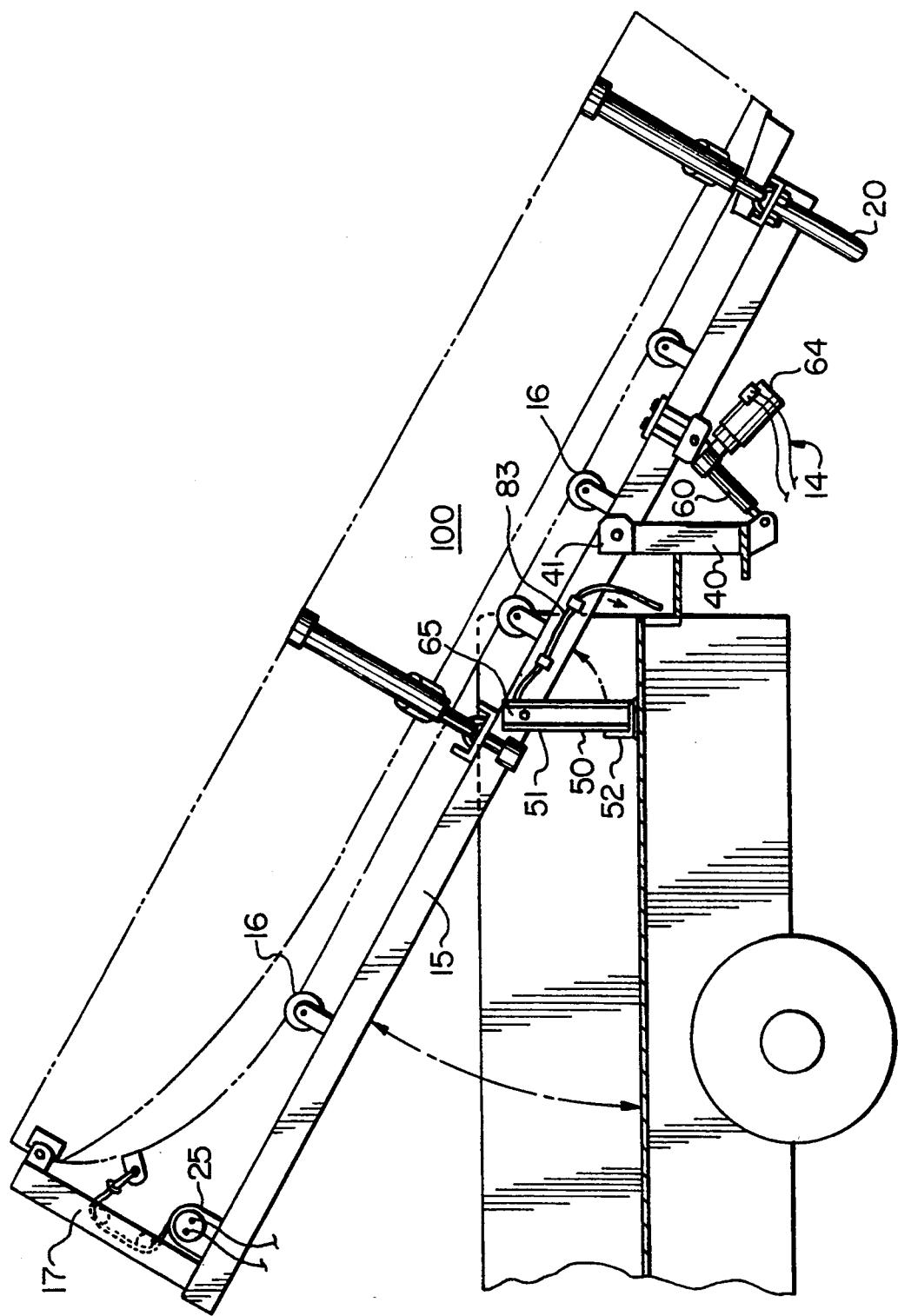
FIG. 2 is a partial cross-sectional side view depicting a boat positioned on the apparatus prior to launching.
Figure 3:
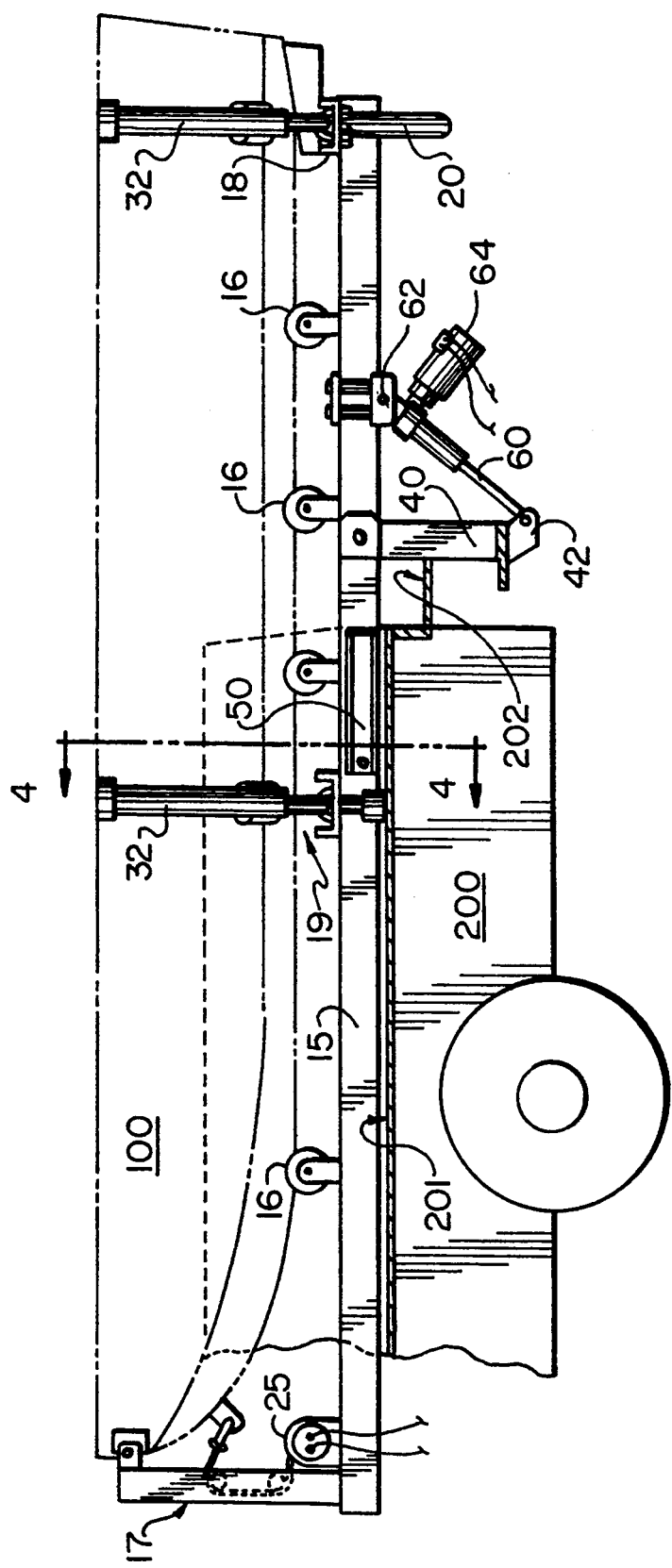
FIG. 3 is a partial cross-sectional side view depicting a boat deployed in its transport or storage mode.

Furthermore, the U-shaped protective extension (20) as shown in FIGS. 1 and 2 is dimensioned to limit the downward travel of the outboard end of the trailer framework unit (11); while the rubber bumper elements (21) on the intermediate cross-beam member (19) cushion the weight applied by the boat (100) when deployed in the transport mode as depicted in FIGS. 3 and 4.

As can also be seen by reference to FIGS. 1 through 3 the winch post (17) which is disposed on the inboard end (15') of the support beam (15) is also provided with a conventional electric winch member (25) whose operation is well recognized.

Figure 5:
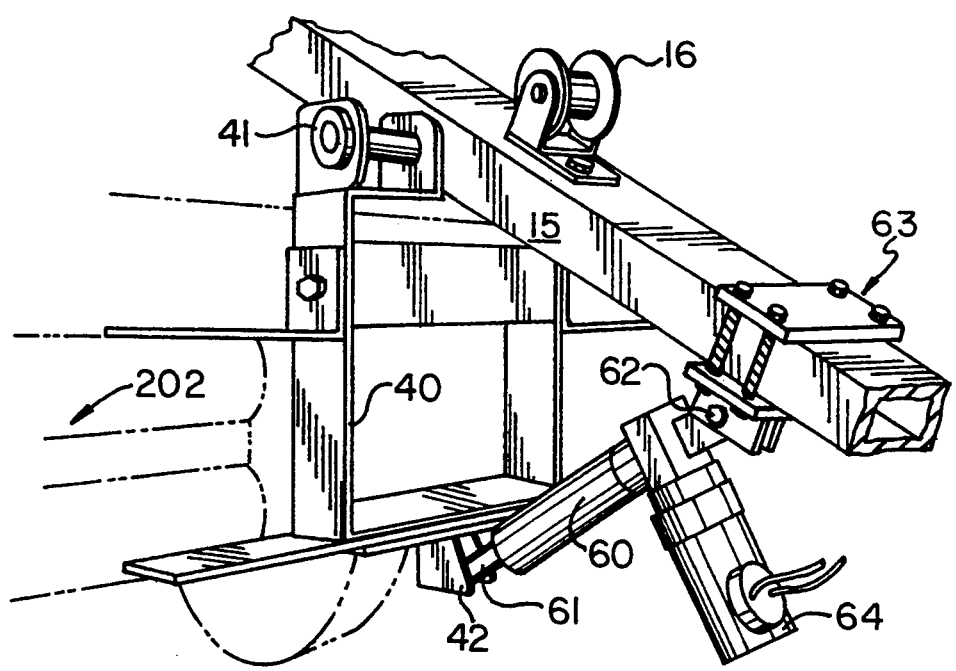

Turning now to FIGS. 1, 3 and 5, it can be seen that the main support unit (12) comprises a generally rectangular reinforced support bracket member (40) having upper (41) and lower (42) pivot members operatively disposed thereon.

As shown in FIGS. 1, 3 and 5, the support bracket member (40) is operatively secured to the rear bumper (202) of the truck (200) at a location; wherein, the main upper pivot member (41) is disposed at point rearwardly offset from the center of the truck bumper (202). In addition the main pivot member (41) is operatively secured to the main support beam member (15) at a location spaced rearwardly from the centerline of the main support beam member (15) for reasons that will be explained presently.

As shown in FIG. 2, the auxiliary support unit (13) comprises a retractable auxiliary support leg (50) which is pivotally secured (51) on one end to the main support beam (15) at a point proximate the midpoint of the main support beam (15); wherein, the other end is provided with a cushion element (52) such that the cushion element (52) will prevent the auxiliary support leg (50) from marring the bed (201) of the truck (200) when the boat (100) is being loaded onto the truck (200).

The automatic control means (14) as shown in FIG. 5, comprises an electric actuator (60) which is pivotally secured on one end (61) to the lower pivot member (42) of the main support bracket (40); and is pivotally secured on its other end (62) to an outboard mounting bracket (63) that is attached to the main support beam member (15). In addition the electric actuator (60) is controlled by a first automatic control member (64) which governs the extension and retraction of the hydraulic cylinder (60) in a well recognized fashion to raise and lower the main support beam (15) relative to the bed (201) of the truck (200).

Furthermore, the automatic control means (14) also includes a spring loaded cable member (83) which is operatively secured on one end (65) to the upper end (51) of the auxiliary support leg (50); and, having a control lever (66) disposed on the other end of the cable member (83) to vary the position of the auxiliary support leg (50) in a well recognized fashion.

In operation, the apparatus (10) is used to transport a boat (100) to and from a launching site in the orientation depicted in FIG. 3; wherein, the auxiliary support leg 50 is disposed in the retracted position below the main support beam (15), and the rubber bumper elements (21) on the intermediate cross-beam member (19).

Turning now to FIGS. 1 and 2, it can be seen that once the vehicle operator arrives at the launching site it is a very simple matter to both launch and retrieve the boat (100) from the apparatus (10). To begin with since the weight of most boats is concentrated towards the stern of the boat, the center of gravity of the boat will be situated aft of the dimensional center of the craft; such that the center of gravity of the boat will be disposed proximate the location of the main pivot member (41).

As a consequence of this weight distribution the moment arm exerted by the center of gravity of the boat is substantially minimized with the present arrangement; such that a minimum amount of counteracting force has to be exerted by the electric actuator (60) to raise the boat (100) to the position illustrated in FIGS. 1 and 2 via actuation of the automatic control member (64) to retract the electric actuator (60) and pivot the trailer support unit (11) about the main support unit (12).

Once the main support beam (15) is disposed in the configuration of FIGS. 1 and 2, the cable lever control lever (66) is actuated to extend the auxiliary support leg (50) downwardly into engagement with the truck bed (201) to insure that the main support beam (15) is maintained in its tilted orientation.

At this juncture the power winch (25) is actuated in a well recognized manner to permit the boat to slide over the rollers and into the water to accomplish the launching of the craft.

Obviously to retrieve the boat the process is reversed; wherein, the auxiliary support leg is not retracted until a substantial portion of the boat hull is disposed on the trailer framework unit (11) whereupon the power winch (23) and the automatic control member (64) will be selectively actuated to complete the retrieval of the craft and the return of the craft into the transport mode.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

We claim:

1. In combination, a boat launching apparatus and a pick-up truck having a truck bed with a cab end and a tailgate end and a rear bumper located at the tailgate end comprising:

a boat-carrying framework including an elongated main support beam having an inboard end and an outboard end, and a plurality of generally U-shaped cross beam members located at predetermined positions along a length of the main support beam, the framework including roller assemblies that rotatably engage a boat positioned on each of the plurality of cross beam members;

a main support comprising a support bracket having an upper portion and a lower portion, the lower portion rigidly secured to, and centrally located on, the rear bumper of the pick-up truck; and a main pivot operatively attached to both the main support beam and the upper portion of the support bracket, the main pivot passing through the main support beam along a direction substantially transverse to a direction of elongation of the support beam, the main pivot being positioned on the support beam so that the inboard end is located substantially adjacent the cab end of the bed and the outboard end is located remote from, and outwardly of, the tailgate end of the bed, the main pivot being constructed and arranged so that the beam rotates on the main pivot from a boat-carrying position wherein the beam is substantially parallel with the bed to a boat-unloading position wherein the inboard end is located above the bed and the outboard end is located at a level below a level of the bed.

2. The apparatus as in claim 1; further comprising a pivoting member that pivotally rotates the boat-carrying framework about the main pivot, the pivoting member including a piston member operatively secured on one end to the main support beam so that an extension and a retraction of the piston member causes the main support beam of the boat-carrying framework to pivot about the main pivot.

3. The apparatus as in claim 2; wherein, the piston member is provided with an automatic control member that controls extension and retraction of the piston member.

4. The apparatus as in claim 1; further comprising an auxiliary support unit including a retractable auxiliary support leg pivotally secured on one end to the main support beam.

5. The apparatus as in claim 4; further including means for extending and retracting the auxiliary support leg relative to said main support beam.

6. The apparatus as in claim 1; wherein, the main pivot is disposed rearwardly of the midpoint of the main support beam.

7. The apparatus as in claim 6; wherein the main pivot is offset relative to the upper portion of the support bracket.

8. The apparatus as in claim 1; wherein, one of said plurality of cross-beam members is disposed on the outboard end of the main support beam.

9. The apparatus as in claim 8; wherein, said one of said. plurality of cross-beam members is further provided with a downwardly depending generally U-shaped protective extension which limits the downward travel of the outboard end of the main support beam.

10. The apparatus as in claim 9; wherein, the main support beam includes a plurality of keel rollers.

11. The apparatus as in claim 1; wherein, the inboard end of the main support beam is provided with a winch post and a powered winch.

12. The apparatus as in claim 1; wherein, the main pivot is positioned so that the support beam contacts the bed and is supported by the bed when the main support beam is in the boat-carrying position substantially parallel to the bed.

13. A boat launching apparatus for use with a pick-up truck having a truck bed with a cab end and a tailgate end, the apparatus comprising:
a boat-carrying framework including an elongated main support beam having an inboard end and an outboard end, and a plurality of generally U-shaped cross beam members located at predetermined positions along a length of the main support beam for engaging sides of a boat;
a main support comprising a support bracket having an upper portion and a lower portion, the lower portion rigidly secured to, and centrally located on, the tailgate end of the bed of the pick-up truck; and
a main pivot operatively attached to both the main support beam and the upper portion of the support bracket, the main pivot passing through the main support beam along a direction substantially transverse to a direction of elongation of the support beam, the main pivot being positioned on the support beam so that the inboard end is located substantially adjacent the cab end of the bed and the outboard end is located remote from, and outwardly of, the tailgate end of the bed, the main pivot being constructed and arranged so that the beam rotates on the main pivot from a boat-carrying position wherein the beam is substantially parallel with the bed to a boat-unloading position wherein the inboard end is located above the bed and the outboard end is located at a level below a level of the bed.

14. The apparatus as in claim 13; further comprising a pivoting member that pivotally rotates the boat-carrying framework about the main pivot, the pivoting member including a piston member operatively secured at one end to the main support beam so that an extension and a retraction of the piston member causes the main support beam of the boat-carrying framework to pivot about the main pivot.

15. The apparatus as in claim 14; wherein, the piston member includes an automatic control member that controls the extension and the retraction of the piston member.

16. The apparatus as in claim 13; further comprising an auxiliary support unit including a retractable auxiliary support leg pivotally secured at one end to the main support beam.

17. The apparatus as in claim 13; wherein, the main support beam includes a plurality of keel rollers.

18. The apparatus as in claim 13; wherein, the inboard end of the main support beam includes a winch post and a powered winch.

* * * * *